(12) United States Patent
Hammarstrand

(10) Patent No.: US 6,283,883 B1
(45) Date of Patent: Sep. 4, 2001

(54) POWER TRANSMISSION SYSTEM

(76) Inventor: Ove Hammarstrand, Fiskebyvägen 14, 824 00 Hudiksvall (SE)

(*) Notice: Subject to any disclaimer, the term of this patent is extended or adjusted under 35 U.S.C. 154(b) by 0 days.

(21) Appl. No.: 09/403,091

(22) PCT Filed: Apr. 15, 1998

(86) PCT No.: PCT/SE98/00686
§ 371 Date: Oct. 15, 1999
§ 102(e) Date: Oct. 15, 1999

(87) PCT Pub. No.: WO98/46912
PCT Pub. Date: Oct. 22, 1998

(30) Foreign Application Priority Data

Apr. 16, 1997 (SE) .................................................. 9701425

(51) Int. Cl.[7] ............................................... F16H 47/04
(52) U.S. Cl. ............................................... 475/72; 475/80
(58) Field of Search ................... 475/72, 80, 82, 475/81

(56) References Cited

U.S. PATENT DOCUMENTS

| | | | |
|---|---|---|---|
| 3,866,490 | 2/1975 | Orshansky, Jr. | 74/687 |
| 4,291,592 | * 9/1981 | Meyerle et al. | 74/687 |
| 4,567,787 | * 2/1986 | Smith | 74/687 |
| 4,750,381 | 6/1988 | Kita et al. | 74/687 |
| 4,896,563 | * 1/1990 | Manor et al. | 74/677 |

FOREIGN PATENT DOCUMENTS

| | | |
|---|---|---|
| 3303886A1 | 12/1983 | (DE). |
| 1174778 | 12/1969 | (GB). |
| 1379213 | 1/1975 | (GB). |

* cited by examiner

*Primary Examiner*—Sherry Estremsky
*Assistant Examiner*—Tisha D. Lewis
(74) *Attorney, Agent, or Firm*—Burns, Doane, Swecker & Mathis, LLP (57) ABSTRACT

A power transmission system includes a rotatable and drivable first shaft (1a) adapted for co-action with a motor (1c) included in a planetary gear arrangement (P), and further includes a second shaft (8) that can be driven by the planetary gear arrangement. The planetary gear arrangement (1) includes a centrally positioned sun gear (1b) that co-acts with said first shaft, a plurality of planet gears (1d) that can co-act with the sun gear, and a ring gear (1e) that co-acts with the planet gears, and a gear or wheel (1f) that holds the planet gears. A hydraulic system (10) belonging to the planetary gear arrangement (P) includes a pump unit (10a) and a motor unit (10b) among other things. The ring gear (1e) can be braked via a first coupling unit (3), so as to be stationary in relation to a chassis (4) in a low speed range, but free for rotation in a higher speed range. The first shaft (1a) functions to cause the sun gear (1b) to rotate. The hydraulic pump unit (10a) is coupled directly or indirectly to the gear (1f) that holds the planet gears. The hydraulic motor unit (10b) is coupled directly or indirectly to the second shaft (8). In a chosen high speed range, a second coupling unit (5) functions to co-ordinate the rotary movement of the ring gear (1e) with the rotary movement of the hydraulic motor (10b).

7 Claims, 5 Drawing Sheets

Fig. 13

POWER TRANSMISSION SYSTEM

FIELD OF INVENTION

The present invention relates to a power transmission system that includes a rotatable and drivable first shaft which is adapted for co-action with a motor that forms part of a planetary gear arrangement, and a second shaft which is driven by said arrangement, wherein a planet gear belonging to the planet gear arrangement includes a centrally positioned sun wheel that co-acts with said first shaft, a number of planet wheels co-actable with said sun wheel, and a ring wheel co-acting with the planet wheels, and wherein an hydraulic system belonging to the planet wheel arrangement includes a pump unit and a motor unit, among other things.

The inventive power transmission system is adapted to drive a vehicle, preferably a cross-country vehicle, such that the first shaft can be conveniently-driven at a constant or gene. rally constant speed, so as therewith to drive an engine at a speed that corresponds to low contaminant emissions, high fuel economy and/or maximum power, regardless of vehicle driving conditions.

A power transmission system of the aforesaid kind is used to advantage in engine-powered vehicles where there is a need to be able to drive the vehicle in a low speed range, such as cross-country driving, or in a high speed range, such as along roads and highways.

More specifically, the present invention relates to a power transmission system that is based on the use of a planet gear in which the ring wheel belonging to said planet gear is braked and stationary in relation to the chassis when the second shaft, the output shaft, is driven hydraulically within a low speed range and where the ring wheel is free-running and can rotate within a high speed range.

In the following description, the low speed range is illustrated as 0–25 km/hr and the high speed range as 0–50 km/hr, although these speed ranges shall only be seen as examples of speed ranges.

The following description describes the co-action between different wheels, by which is meant preferably nonslipping co-action, such as a gearwheel co-action.

By direct coupling is meant direct co-action between two or more wheels, and by indirect coupling is meant co-action caused through the medium of one or more co-actable wheels.

By "wheel" is primarily meant a "gearwheel" in tooth co-action with one or more adjacent gearwheels.

BACKGROUND OF THE INVENTION

Several different kinds of such-power transmission systems are known in the art.

An example of such systems is described in Patent Publication DE-3 303 886. This publication describes and illustrates a planetary gear arrangement which includes a sun wheel (13) connected to a drive shaft (12), at least two planet wheels (18, 19), and a ring wheel (20) which functions to drive an output shaft (22) while using an hydraulic torque converter (27, 28, 29).

The torque converter comprises two hydraulic pumps (27, 28); each co-acting with its individual planet wheel (18, 19), and connected hydraulically via a hydraulic conduit system (29).

Patent Publication U.S. Pat. No. 3,866,490 describes and illustrates a transmission system which uses a planet gear arrangement to regulate the speed of an output shaft in relation to an input shaft.

More specifically, the input shaft (11) is connected directly for driving the planet wheel carrier (16) via a connection sleeve (17), and therewith the planet wheels (18, 19).

The outputs of this planetary gear assembly (15) comprise the ring wheel (20) on the one hand and the sun wheel (21) on the other hand.

A shaft (29) co-acts with a gearwheel (30) which, in turn, co-acts with a gearwheel (31) and drives an hydraulic unit (33) with variable displacement.

Patent Publication U.S. Pat. No. 4,750,381 teaches an hydromechanical transmission that can be used as an efficient, continuously variable transmission with the aid of a differential mechanism.

This publication discloses the use of an hydraulic transmission mechanism, a mode selecting mechanism, a locking mechanism and a clutch mechanism.

It will be noted in particular that the input shaft (11) acts on the planet wheels, and that the sun wheel is coupled directly to a pump unit (5) having a fixed pump/motor displacement, which is coupled hydraulically to a variable displacement unit (7).

The publication also describes the use of a locking mechanism (11) related to the sun wheel shaft and a clutch (12) belonging to the unit (7).

Patent Publication GB-A 1 174 778 describes and illustrates a transmission mechanism which is particularly adapted for automotive vehicles, said transmission mechanism being of the kind in which power is divided between a mechanical path and an hydrostatic path.

As with the present invention, this transmission mechanism is adapted particularly for use with cross-country vehicles, such as tractors, and carries out a major part of its work under conditions that require a low speed range and a high torque.

Patent Publication GB-A 1 379 213 illustrates and describes an hydromechanical transmission system that is able to offer a plurality of driving speed ranges.

There is used to this end an input shaft (10) and an output shaft (12), and a duplicated planetary gear arrangement (4) and an hydrostatic transmission (16) that can co-act with the two planetary gear arrangements (14).

SUMMARY OF THE INVENTION

Technical Problems

When taking into consideration the technical deliberations that a person skilled in this particular art must make in order to provide a solution to one or more technical problems that he/she encounters, it will be seen that on the one hand it is necessary initially to realise the measures and/or the sequence of measures that must be undertaken to this end, and on the other hand to realise which means is/are required in solving one or more of said problems. On this basis, it will be evident that the technical problems listed below are highly relevant to the development of the present invention.

When considering the prior art as described above, it will be seen that a technical problem resides in creating in a power transmission system of the aforedescribed nature conditions which will enable the system to operate within both a low speed range and a high speed range, and to realise the significance of allowing the ring wheel to be braked and made stationary relative to the chassis with regard to the low speed range and to allow the ring wheel to rotate in the high speed range, and therewith realise the significance of allowing the input shaft to drive the sun wheel and allowing the planet wheels to drive an hydraulic pump unit which is coupled hydraulically to an hydraulic motor, said unit functioning to drive the output shaft.

Another technical problem is one of realising the significance of creating while using one single planetary gear assembly including sun wheel, planet wheel and ring wheel such that the low speed range solely utilises an hydraulic system, a variable displacement hydraulic motor, and an hydraulic clutch arrangement for speed control while using the mechanical planet wheel function in the high speed range, and by causing the hydraulic system to provide a split torque function in this latter application.

In respect of a power transmission system of the aforedescribed nature, a technical problem resides in realising the significance of adapting a first coupling or clutch unit for action between the ring wheel and/or a first gearwheel co-acting with said ring wheel, and a chassis, and adapting a second coupling or clutch unit for action between a second gearwheel co-acting with said hydraulic motor unit and said first gearwheel so as to drive said gearwheels simultaneously.

Another technical problem is one of realising the significance of causing the first coupling element to be in an actively coupled position or state and to lock the ring wheel against rotation in the first speed range, while causing the second coupling unit to be in an inactively-coupled state and therewith permit relative movement between said two gearwheels or the like, where said second gearwheel is rotatably mounted on the second shaft, the output shaft, and in that in said high speed range the first coupling element is in an inactively coupled state and releases the ring wheel for rotation, whereas the second coupling unit is in an actively coupled state and co-ordinates the rotary movement of the two gearwheels or the like.

Another technical problem resides in creating in a power transmission system of the aforedescribed nature conditions whereby the first shaft is adapted to drive the pump unit either directly or indirectly in the low speed range, through the medium of a wheel or drive coupled to the planet wheels, said drive functioning as a planet wheel carrier.

Another technical problem is one of realising the significance of coupling the hydraulic variable displacement pump unit drivingly to the motor unit, said motor unit also being adapted for displacement control and said coupling being effected via an adapted hydraulic valve arrangement.

Another technical problem is one of realising the significance of rotatably arranging the motor unit for adjustment of the motor power via displacement control, and of rotatably arranging the pump unit for adjustment of the pump power via displacement control, and therewith also realising the significance of using a pump unit (or a motor unit) that can be regulated within the positive and/or the negative range.

Still another technical problem is one of realising the significance of and the advantages associated with allowing the first and/or the second coupling unit to be activated and deactivated through the medium of a valve arrangement belonging to the hydraulic system.

Another technical problem is one of realising the significance of and the advantages associated with enabling the maximum displacement of the pump unit to be equal to half, or essentially half, the maximum displacement of the motor unit.

It will also be seen that a technical problem also resides in the provision of conditions with the aid of simple means and measures that will enable a low hydraulic flow to be regulated and controlled while eliminating the risk of oscillation and run-away effects.

Solution

With the intention of solving one or more of the aforesaid technical problems, the present invention takes as its starting point a power transmission system that includes a rotatable and drivable first shaft which is adapted for co-action with a motor forming part of a planetary gear arrangement, a second shaft which is driven by said planetary gear arrangement, wherein a planet gear belonging to said planetary gear arrangement includes a centrally placed sun wheel which co-acts with said first shaft, a number of planet wheels co-actable with said sun wheel, a ring wheel that co-acts with said planet wheels, a planet wheel carrier, and an hydraulic system which belongs to the planet gear arrangement and which includes a pump unit and a motor unit, and wherein the ring wheel belonging to said planet gear can be braked via a first coupling unit and therewith remain stationary relative to a chassis in a low speed range or released for rotation in a high speed range, and wherein the hydraulic system is adapted to drive the second shaft with pump units and motor units in the low speed range, while providing a split-torque function in the high speed range.

In accordance with the invention, a power transmission system of this kind is characterised in that the first shaft is adapted to rotate the sun wheel, in that the hydraulic pump unit is coupled either directly or indirectly to the planet wheel carrier, in that the hydraulic motor unit is coupled to the second shaft either directly or indirectly, and in that the system includes a second coupling element which functions to co-ordinate the rotary movement of the ring wheel with the rotary movement of the hydraulic motor in the high speed range.

As proposed embodiments that lie within the scope of the inventive concept, it is also proposed that a first coupling unit shall be adapted to act between a wheel co-acting with the ring wheel and the chassis, and that the second coupling unit shall be adapted to act between a wheel co-acting with said motor unit and the wheel co-acting with said ring wheel for common rotary movement and rotation of the second shaft.

It is also proposed that said first coupling unit is in an actively coupled state in said low speed range, while said second coupling unit is in an inactively coupled state, and that said first coupling unit is in an inactively coupled state in said high speed range while the second coupling unit is in an actively coupled state.

It is also proposed that a speed adjustment can be effected in the low speed range solely through the medium of an hydrostatic process between an hydraulic pump unit and an hydraulic motor unit having variable displacement, while a speed adjustment is made in the high speed range while using the planet gear function, one with a rotatable ring wheel, and said hydraulic system.

It is also proposed in accordance with the invention that the first shaft is adapted to drive said pump unit indirectly in said low speed,range, via the planet wheel carrier and a wheel connected to said carrier.

According to another embodiment of the invention, the pump unit has a variable displacement and is coupled to drive said motor unit, which also has a variable displacement, via an hydraulic valve arrangement that has its own power source.

The invention is also based on the realisation that when the second shaft rotates at a high speed within the high speed range, the motor unit present in the hydraulic system will be set essentially to zero and therewith freely rotatable, and that the pump unit will be prevented from rotating in this motor setting and is essentially stationary, wherein the rotational movement of the first shaft is transferred directly to the second shaft via the sun wheel, the planet wheel and the ring wheel.

According to another embodiment, the hydraulic motor unit is pivotally mounted for adjustment of the motor power through the medium of changing the displacement, and the hydraulic pump unit is pivotally mounted arranged for adjustment of the pump power via a displacement adjustment within the positive and/or the negative range.

According to another embodiment, the first and/or the second coupling unit is/are activatable and de-activatable through the medium of a valve arrangement belonging to an hydraulic system.

It is also proposed in accordance with the invention that the maximum displacement of the pump unit will be equal to half, or essentially half, the maximum displacement of the motor unit.

Advantages

Those advantages primarily afforded by an inventive power transmission system reside in the provision of conditions whereby the speed of a vehicle can be readily varied within a low speed range with low losses and while utilising a planet gear and an hydraulic system, by solely utilising the hydraulic system and blocking the effect of the ring wheel of said planet gear, while utilising the planet gear function in a higher speed range with the aid of said hydraulic system, and therewith influencing the speed range by providing a split torque function.

The primary characteristic features of an inventive power transmission system are set forth in the characterising clause of the following claim 1.

BRIEF DESCRIPTION OF THE DRAWINGS

The invention will now be described in more detail with reference to an embodiment at present preferred and having features significant of the present invention, and with reference to the accompanying drawings, in which.

DETAILED DESCRIPTION OF EMBODIMENTS AT PRESENT PREFERRED

Figure 1:
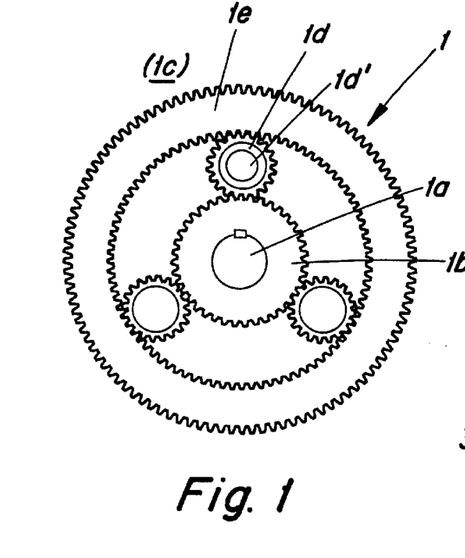
FIG. 1 illustrates a planetary gear assembly from above.

FIG. 1 is a side view of a known planetary gear mechanism 1 which includes a rotatable and drivable first shaft 1a adapted for co-action with a motor (1c) not shown in FIG. 1 and also for co-action with a sun gear 1b.

The sun gear 1b co-acts (via tooth engagement) with three symmetrically orientated planet gears, of which one is referenced 1d. The planet gears 1d co-act (via tooth engagement) with a ring gear 1e. The planet gears 1d are held firmly by a gear or drive if functioning as a planet gear carrier via their respective shafts, such as the shaft 1d'.

The invention will be described with the assumption that the first shaft 1a is driven at a constant speed and that the speed at which the output shaft 8 is rotated can be varied within predetermined values (0–25 km/hr or 0–50 km/hr).

It is also presumed that the teeth of respective gears co-act with one another, although some other equivalent co-action can be envisaged.

Figure 2:
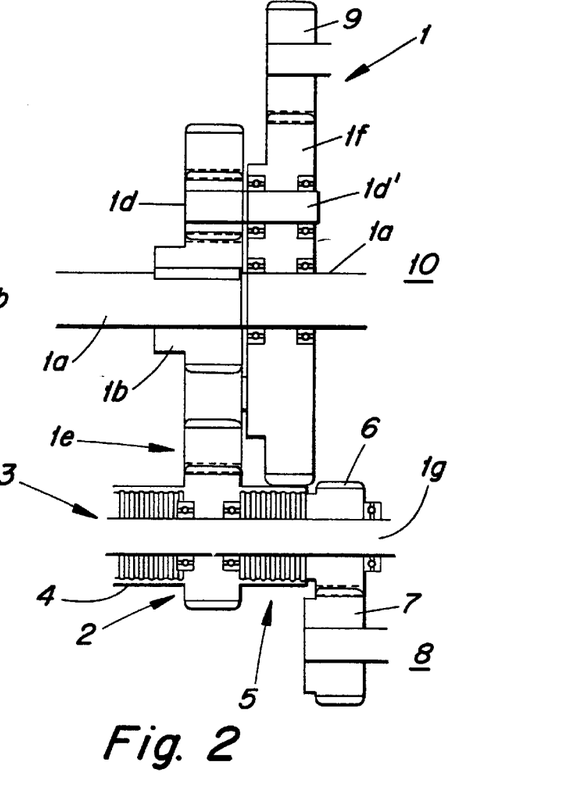
FIG. 2 is a sectional view of the planetary gear assembly shown in FIG. 1, supplemented with necessary clutch or coupling units.

As will be seen from FIG. 2, the shaft 1a is fixed in relation to the sun gear 1b, and the gear or drive 1f is rotatably connected to the shaft 1a via a bearing arrangement, therewith enabling the gear or drive 1f to rotate in a manner that deviates from the rotational movement of the shaft 1a.

As will also be apparent from FIG. 2, the ring gear 1e co-acts peripherally with a gear or drive 2, a so-called split-torque drive, said drive 2 being mounted on bearings for rotation relative to a shaft 1g.

A first coupling unit 3 is adapted to lock the gear or drive 2 in relation to a stand or chassis 4 in an activated state of said unit 3, therewith preventing the ring gear 1e from rotating.

The ring gear 1e may alternatively be locked with the aid of other means or measures.

When the coupling unit or clutch 3 is in an inactive state, rotary movement of the ring gear 1e can be transmitted to the shaft 1g via the drive 2 and also via a second coupling unit or clutch 5, in a manner described in more detail hereinafter.

The coupling unit 3 has the form of a disc clutch and when compressed (active state) latches the gear or drive 2 against the chassis 4, and thus holds the gear stationary.

The gear 2 latches the ring gear 1e, wherewith rotary movement of the shaft 1a is transmitted directly to the planet gears 1d which therewith rotate the planet carrier or holder 1f in peripheral tooth engagement with a gear 9.

The coupling unit 5 has the form of a disc clutch and when compressed (activated) brings the gears 6 and 2 to a position or their common rotation. Since the gear 6 is fixedly connected to the shaft 1g, the common rotation of the gears 2, 6 will drive the shaft 1g and therewith the gear 7 fixedly connected to the second shaft 8.

Driving of the shaft 1g also drives the hydraulic motor, or vice versa.

The inventive planetary gear arrangement "P" shown in FIG. 5 includes the aforedescribed planetary gear mechanism 1 and also an associated hydraulic system 10 of a kind that will be described in more detail hereinafter with reference to FIGS. 7 and 13 and FIG. 8 respectively.

The power transmission is changed by changing the displacement of the hydraulic pump unit 10a in a known manner, by pivoting the pump unit.

The power requirement and power transmission are changed, by changing the displacement of the hydraulic motor unit 10b in a known way, by pivoting said unit. The shaft 1g and the shaft 8 are shown to rotate at the same speed in the illustrated case. Means for changing the displacement and therewith the rotational speed of the output shaft are known and will not therefore be described in detail here.

Figure 3:
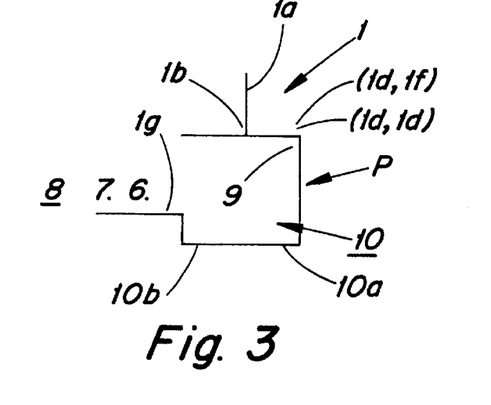
FIG. 3 illustrates the principle of speed control in a first, low speed range.

FIG. 3 illustrates the principle function of the planetary gear arrangement "P" in the low speed range, wherein the rotary movement of the first shaft 1a is transmitted to the hydraulic system 10 via the drives 1b, 1d and 1f and the gear 9, wherein said hydraulic system solely influences rotation of the second-shaft 8, with the aid of a pump unit 10a driven by said hydraulic system and a motor unit 10b driven by the pump unit 10a. It follows from this that the planetary gear arrangement 1 does not participate in the transmission of the speed ratio between the shafts 1a and 8, but functions solely as a drive source for the hydraulic pump unit 10a.

Figure 4:
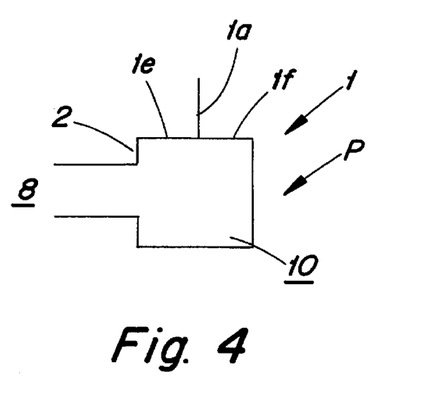
FIG. 4 illustrates the principle of speed control in a second, higher speed range.

FIG. 4 is intended show that the function of the planetary gear arrangement 1 is utilised, in that the ring gear 1e is rotatably mounted so that the output shaft 1g, 8 will be driven by the drive 2, and in that the speed at which the ring gear 1e rotates will be determined by the extent to which the hydraulic system 10 is utilised.

In the high speed mode with the output shaft 8 rotating at a high speed, the motor unit 10b and the gear 2 are driven at the same speed at a high r.p.m. The motor unit 10b runs lightly with low displacement or with no displacement, wherewith the pump unit 10a runs sluggishly and slows down the gear 9 and the gear 1f and the rotary movement of the planet gears 1d and the shaft 1a is transmitted to the ring gear 1e.

With diminishing speed under this setting, the pump unit 10a may be set for maximum displacement and the motor unit 10b is angled out for greater and greater displacement. This increased change in the displacement of the motor unit 10b can continue until the pump unit 10a rotates at a maximum permitted speed.

This can be achieved with the aid of means for stopping rotation of the motor unit, so as to obtain a given displacement ratio.

This displacement ratio can also be implemented when dimensioning the respective displacement of the motor unit and the pump unit.

Figure 5:
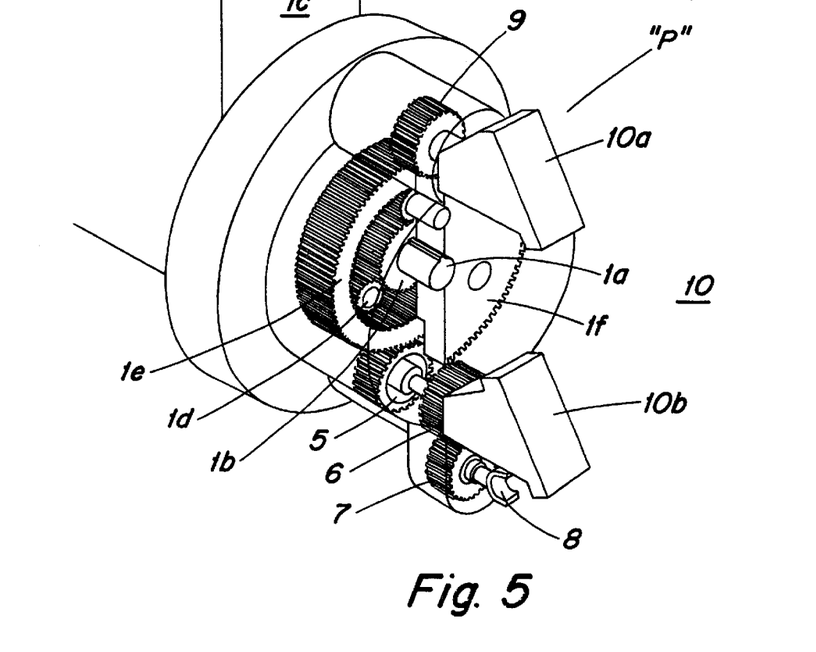
FIG. 5 is a perspective view of an inventive planetary gear arrangement, but with the hydraulic clutch arrangement not shown.

FIG. 5 is a perspective view of one-embodiment of a power transmission system that includes a planetary gear arrangement "P" in accordance with the invention and shows the shaft 1a, the sun gear 1b, the planet gears 1d and the ring gear 1e. The lines or conduits of the hydraulic system have not been shown in FIG. 5. As will be evident from FIG. 5, the toothed ring or gear if holding the planet gears co-acts with a gear or drive 9 which is coupled directly to the pump unit 10a.

It will also be seen from FIG. 5 that the motor unit 10b is coupled directly to the gear or drive 6.

Figure 6:
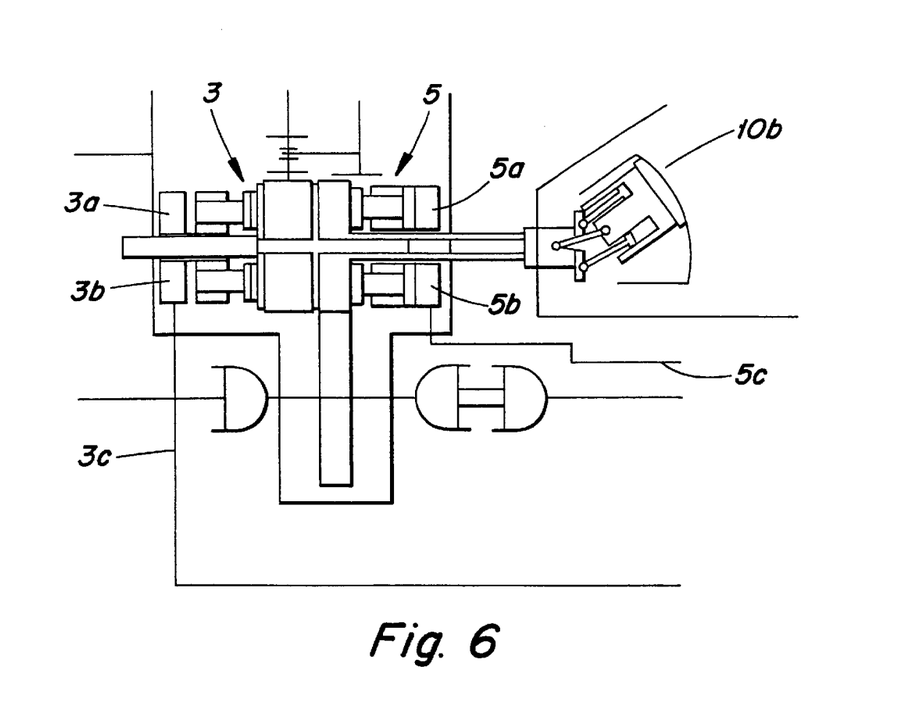
FIG. 6 illustrates part of an hydraulic coupling system which actuates two separate coupling units.

FIG. 6 shows that the coupling unit 3 can be moved between an active and an inactive state or position with the aid of piston-cylinder devices 3a and 3b while using hydraulic pressure in an hydraulic line 3c.

Correspondingly, the coupling unit 5 includes piston-cylinder devices 5a, 5b which are also activated between an active and inactive position with the aid of hydraulic pressure in an hydraulic line 5c.

The conditions required to operate at a low speed within said low speed range with the aid of a first embodiment of an hydraulic coupling arrangement will now be described in detail with reference to FIG. 7.

The brake unit or friction disc 3 is activated in this position, and the drive 2 is therewith locked to the chassis 4 and the ring gear 1e is consequently stationary.

The planet gears 1d will now be driven directly by the shaft 1a and the sun gear 1e, wherewith the gear 1f or the planet gear carrier is also driven.

A gear 9 coupled directly to the gear 1f now drives the hydraulic pump 10a, said pump being coupled to drive the hydraulic motor 10b via two hydraulic lines 10c, 10c'.

The hydraulic motor 10b is coupled directly to the gear 6, said gear being attached to the shaft 1g and therewith drives the gear 7 and the output shaft 8.

The gear 6 co-acts with a coupling unit or a friction lining 5 adapted to provide co-action between the rotary movement of respective gears 2 and 6.

The gears 2 and 6 can rotate freely in relation to one another in an inactive position, and are adapted for common rotary movement in an active position.

In this regard, it may be suitable to allow the motor 10b to initially take a position for maximum displacement, wherewith the displacement of the pump unit 10a driven by the shaft 1a will increase such as to increase the rotational speed of the motor unit 10b and therewith the shaft 8.

Figure 8:
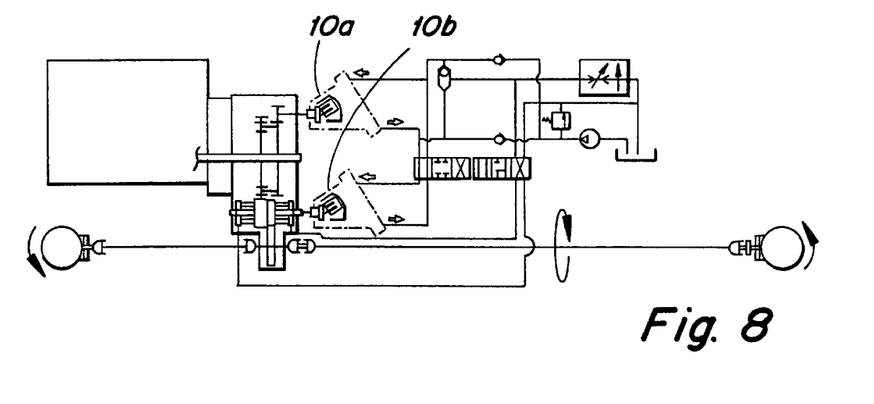
FIG. 8 illustrates the system shown in FIG. 7 at a speed of 12 km/hr, and also shows a second embodiment of a coupling arrangement.

In the state shown in FIG. 8, the pump-unit 10a is pivoted or swung to a position for maximum displacement, while the motor unit 10b still takes a position for maximum displacement.

In other respects, this Figure illustrates a second embodiment of an hydraulic coupling arrangement.

Figure 9:
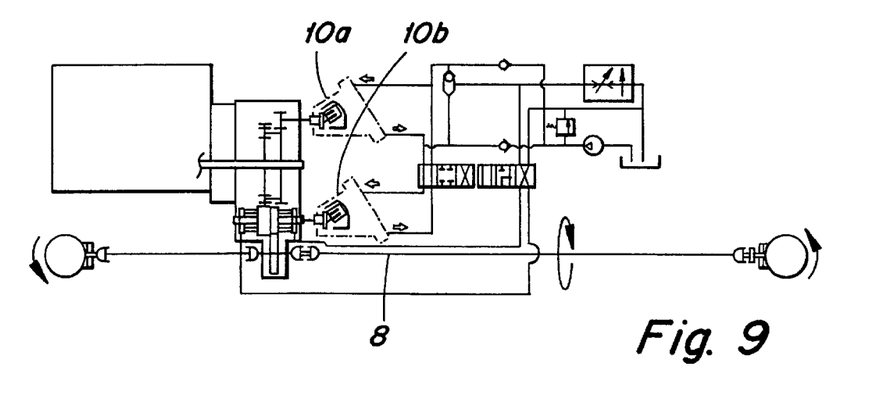
FIG. 9 shows the system of FIG. 8 at a speed of 25 km/hr.

FIG. 9 shows the motor unit 10b swung to a position in which displacement is decreased, whereas the pump unit 10a still takes a position for maximum displacement, so as to further increase the speed at which the shaft 8 rotates.

Figure 10:
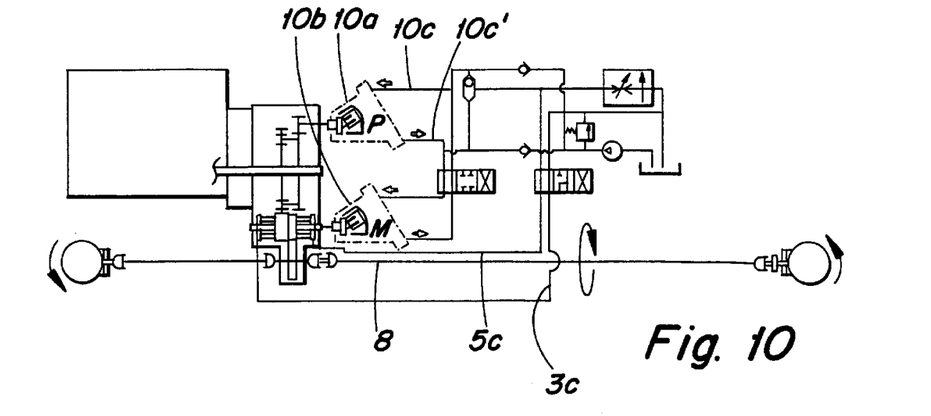
FIG. 10 shows the system at the higher speed range, a speed of about 40 km/hr.

FIG. 10 illustrates the settings of the hydraulic pump 10a and the hydraulic motor 10b at a low speed within the high speed range.

In order for the power transmission system to adopt a mode in the high speed range, it is necessary for the coupling unit 3 to take an inactive position and to enable rotation of the gear 2 to be transmitted to the output shaft 8 (via the gear 6 and the shaft 1g).

The motor unit 10b is coupled directly to the shaft 1g and since the motor unit 10b is only slightly angled and set for a small displacement and coupled hydraulically with the pump unit 10a, which is angled for maximum displacement, the gear or wheel 1f will rotate rapidly since the pump unit 10a exerts only a small force on the gear 9.

The gear 1f or planet gear holder can now rotate at a speed corresponding to the speed of the hydraulic motor shaft 1g, this speed being governed by displacement differences between pump unit 1a and motor unit 10b. The high rotational speed of the planet gears 1d will lower the rotational speed of the ring gear 1e.

Figure 11:
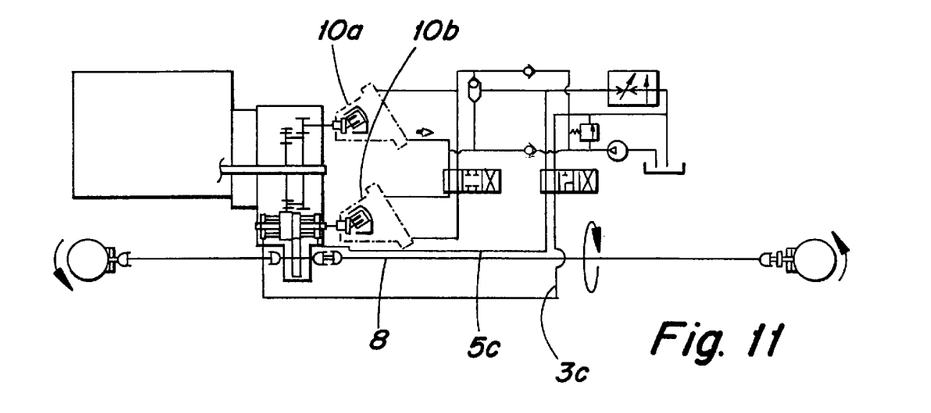
FIG. 11 shows the system of FIG. 10 at a speed of about 50 km/hr.

At full speed within the high speed range, the motor unit 10b according to FIG. 11 will be set to minimum displacement, whereas the pump unit 10a will be set to maximum displacement, whereby the gearwheels 1f and 9 will be stationary and the rotary movement of the shaft 1a will pass directly to the shaft 8 via the planet gears 1d, the ring gear 1e and the gears 2, 6 and 7.

Figure 12:
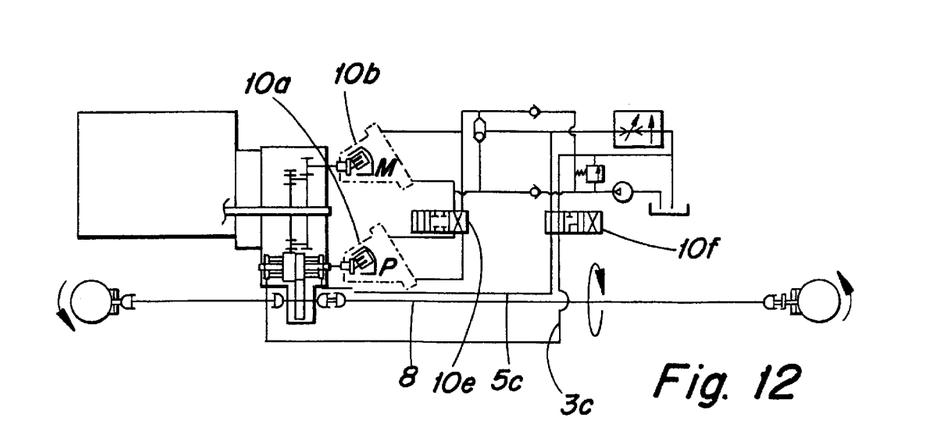
FIG. 12 shows the system coupled for an overdrive function.

The coupling of the motor unit 10b with the pump unit 10a shown in FIG. 12 applies to the overdrive function.

Figure 7:
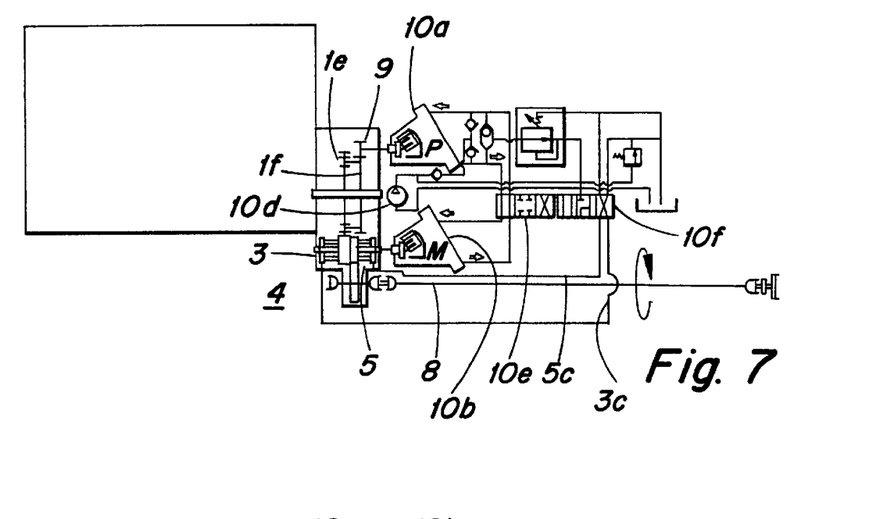
FIG. 7 illustrates the power transmission system in a low speed mode, a creep-speed mode, and shows a first embodiment of a coupling arrangement.
Figure 13:
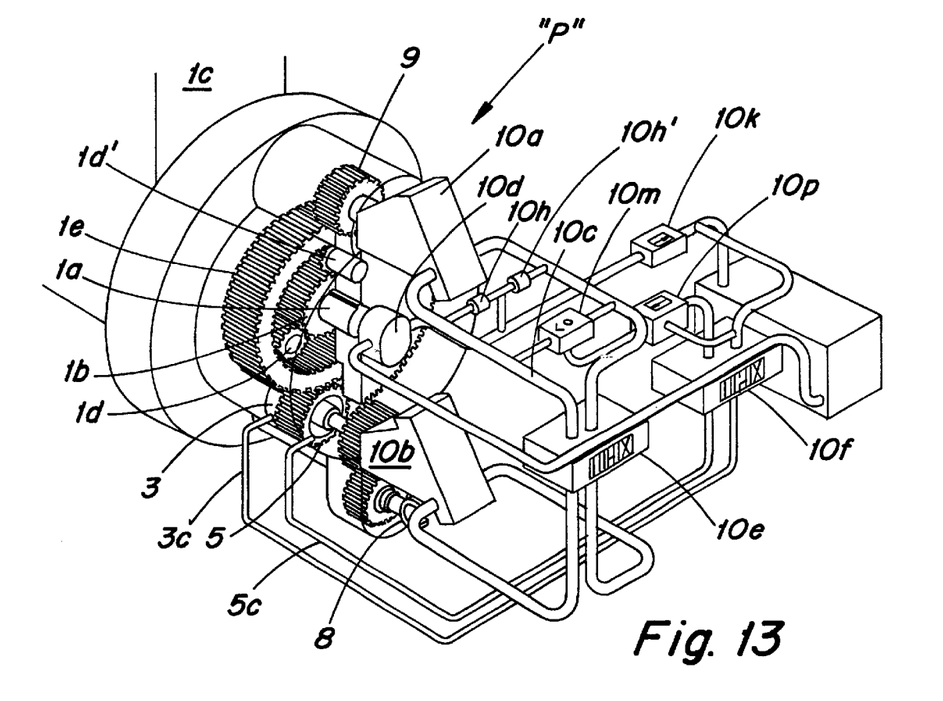
FIG. 13 is a perspective view of the planetary gear arrangement having deliver lines, etc., for the hydraulic coupling arrangement of the first embodiment according to the invention.

An hydraulic system 10 that can be used in conjunction with the present invention will be apparent from FIGS. 7 and 13. These Figures show the use of an hydraulic pump 10d and a pair of valve arrangements 10e, 10f, the methods of operation of which will be evident from the symbols given in FIG. 13.

With regard to the valve arrangement 10e, it will be apparent that this arrangement takes one and the same position in FIGS. 7–11 and therewith enables the pump unit 10a to be coupled directly with the motor unit 10b, whereas FIG. 12 shows that the valve unit 10e switches the motor unit to the pump unit, and vice versa. A change in the direction of rotation of the output shaft (reversing) takes place in this case.

It will also be seen that the valve unit 10f drives hydraulic pressure on the line 5c in FIGS. 7, 8 and 9, while hydraulic pressure occurs on the line 3c in FIGS. 10, 11 and 12.

It will be seen in particular from FIG. 13 that the hydraulic pump 10d is coupled directly to the shaft 1a and therewith driven at a constant rpm.

Check valves 10h, 10h' have been connected between the lines 10c, 10c' and a pressure limiting facility is shown at 10k.

The reference 10m designates a "shuttle" valve and reference 10p designates a pressure-reducing valve.

It will be noted that the hydraulic pump unit 10a can be made variable, so as to be able to vary the pump unit within the positive range and also via 0-ranges over to the negative range (back function).

It will also be noted that the transition from hydrostatic operation to split-torque operation can take place via an intermediate H-coupling in valves 10e, meaning that the hydraulic actuation is disengaged (freewheel).

It will be understood that the invention is not restricted to the aforedescribed and illustrated exemplifying embodiments thereof and that modifications can be made within the scope of the inventive concept as defined in the following Claims.

What is claimed is:

1. A power transmission system that includes a rotatable and drivable first shaft which is adapted for coaction with a motor that forms part of a planetary gear arrangement, and a second shaft which is driven by said arrangement, wherein a planet gear belonging to the planet gear arrangement includes a centrally positioned sun gear that coacts with said first shaft, a number of planet gears able to coact with said sun gear, a ring gear coacting with said planet gears, and a gear holding said planet gears, and wherein an hydraulic system forming part of the planetary gear arrangement includes a pump unit and a motor unit, among other things, and wherein the ring gear belonging to the planetary gear mechanism can be braked via a first coupling unit and therewith held stationary relative to a chassis in a low speed range while being freed for rotation in a high speed range, wherein in the low speed range the hydraulic system functions to drive the second shaft with the pump unit and the motor unit but provides a split-torque function in the high speed range, characterized in that the first shaft is adapted to rotate the sun gear; in that said hydraulic pump unit is coupled directly or indirectly to the gear holding said planet gears; in that said hydraulic motor unit is coupled directly or indirectly to the second shaft; in that a second coupling unit functions to co-ordinate the rotary movement of the ring gear with the pivotal movements of the hydraulic motor in the high speed range; and in that the first coupling unit is adapted to act between a chassis and a gear co-acting with the ring gear; and in that the second coupling unit is adapted to act between a gear co-acting with said motor unit and the gear co-acting with said ring gear for common rotary movement and rotation of the second shaft.

2. A system according to claim 1, characterised in that said first coupling unit is in an active coupled position in said low speed range while the second coupling unit is in an inactively coupled position; and in that said first coupling unit is in an inactively coupled position in said high speed range whereas the second coupling unit is in an actively coupled position.

3. A system according to claim 1, characterised in that in said low speed range said first shaft functions to drive said pump unit via the gear that holds or carries the planet gears and a gear connected to said planet gear carrier.

4. A system according to claim 1, characterised in that said first and/or said second coupling unit can be activatable and de-activatable via a valve arrangement belonging to an hydraulic system.

5. A power transmission system that includes a rotatable and drivable first shaft which is adapted for coaction with a motor that forms part of a planetary gear arrangement, and a second shaft which is driven by said arrangement, wherein a planet gear belonging to the planet gear arrangement includes a centrally positioned sun gear that coacts with said first shaft, a number of planet gears able to coact with said sun gear, a ring gear coacting with said planet gears, and a gear holding said planet gears, and wherein an hydraulic system forming part of the planetary gear arrangement includes a pump unit and a motor unit, among other things, and wherein the ring gear belonging to the planetary gear mechanism can be braked via a first coupling unit and therewith held stationary relative to a chassis in a low speed range while being freed for rotation in a high speed range, wherein in the low speed range the hydraulic system functions to drive the second shaft with the pump unit and the motor unit but provides a split-torque function in the high speed range, characterized in that the first shaft is adapted to rotate the sun gear; in that said hydraulic pump unit is coupled directly or indirectly to the gear holding said planet gears; in that said hydraulic motor unit is coupled directly or indirectly to the second shaft; in that a second coupling unit functions to co-ordinate the rotary movement of the ring gear with the pivotal movements of the hydraulic motor in the high speed range; and in that in said low speed range said first shaft functions to drive said pump unit via the gear that holds or carries the planet gears and a gear connected to said planet gear carrier.

6. A power transmission system that includes a rotatable and drivable first shaft which is adapted for coaction with a motor that forms part of a planetary gear arrangement, and a second shaft which is driven by said arrangement, wherein a planet gear belonging to the planet gear arrangement includes a centrally positioned sun gear that coacts with said first shaft, a number of planet gears able to coact with said sun gear, a ring gear coacting with said planet gears, and a gear holding said planet gears, and wherein an hydraulic system forming part of the planetary gear arrangement includes a pump unit and a motor unit, among other things, and wherein the ring gear belonging to the planetary gear mechanism can be braked via a first coupling unit and therewith held stationary relative to a chassis in a low speed range while being freed for rotation in a high speed range, wherein in the low speed range the hydraulic system functions to drive the second shaft with the pump unit and the motor unit but provides a split-torque function in the high speed range, characterized in that the first shaft is adapted to rotate the sun gear; in that said hydraulic pump unit is coupled directly or indirectly to the gear holding said planet gears; in that said hydraulic motor unit is coupled directly or indirectly to the second shaft; in that a second coupling unit functions to co-ordinate the rotary movement of the ring gear with the pivotal movements of the hydraulic motor in the high speed range; and in that the motor unit included in the hydraulic system is set to zero and freely rotatable in a position for the higher speed adjustment; in that the pump unit is therewith latched and stands stationary, wherein rotary movement of the first shaft is transferred to the second shaft via the sun gear, planet gears and ring gear.

7. A power transmission system that includes a rotatable and drivable first shaft which is adapted for coaction with a motor that forms part of a planetary gear arrangement, and a second shaft which is driven by said arrangement, wherein a planet gear belonging to the planet gear arrangement includes a centrally positioned sun gear that coacts with said first shaft, a number of planet gears able to coact with said sun gear, a ring gear coacting with said planet gears, and a gear holding said planet gears, and wherein an hydraulic system forming part of the planetary gear arrangement includes a pump unit and a motor unit, among other things, and wherein the ring gear belonging to the planetary gear mechanism can be braked via a first coupling unit and therewith held stationary relative to a chassis in a low speed range while being freed for rotation in a high speed range, wherein in the low speed range the hydraulic system functions to drive the second shaft with the pump unit and the motor unit but provides a split-torque function in the high speed range, characterized in that the first shaft is adapted to rotate the sun gear; in that said hydraulic pump unit is coupled directly or indirectly to the gear holding said planet gears; in that said hydraulic motor unit is coupled directly or indirectly to the second shaft; in that a second coupling unit functions to co-ordinate the rotary movement of the ring gear with the pivotal movements of the hydraulic motor in the high speed range; and in that said first and/or second coupling unit can be activatable and de-activatable via a valve arrangement belonging to an hydraulic system.

\* \* \* \* \*